Nov. 4, 1952  J. N. POLIVKA ET AL  2,616,674
FOOD MIXER
Filed Jan. 3, 1950  3 Sheets-Sheet 3
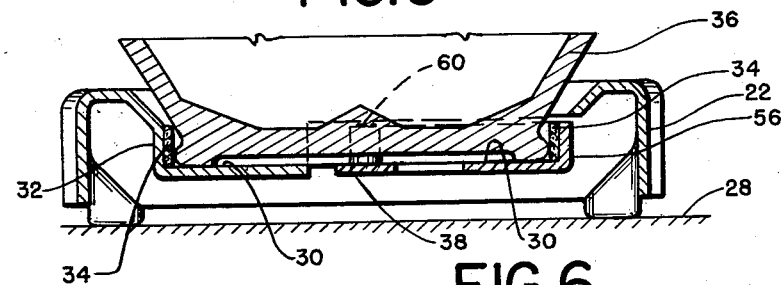
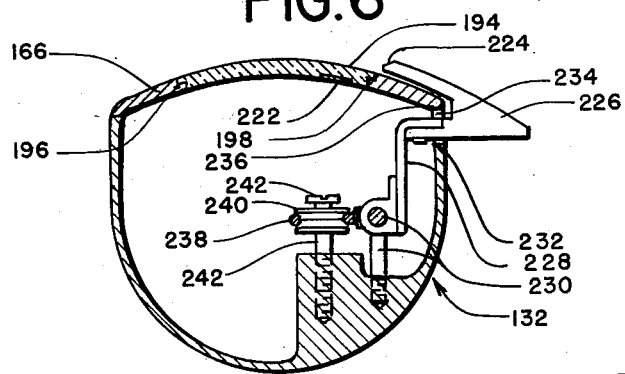
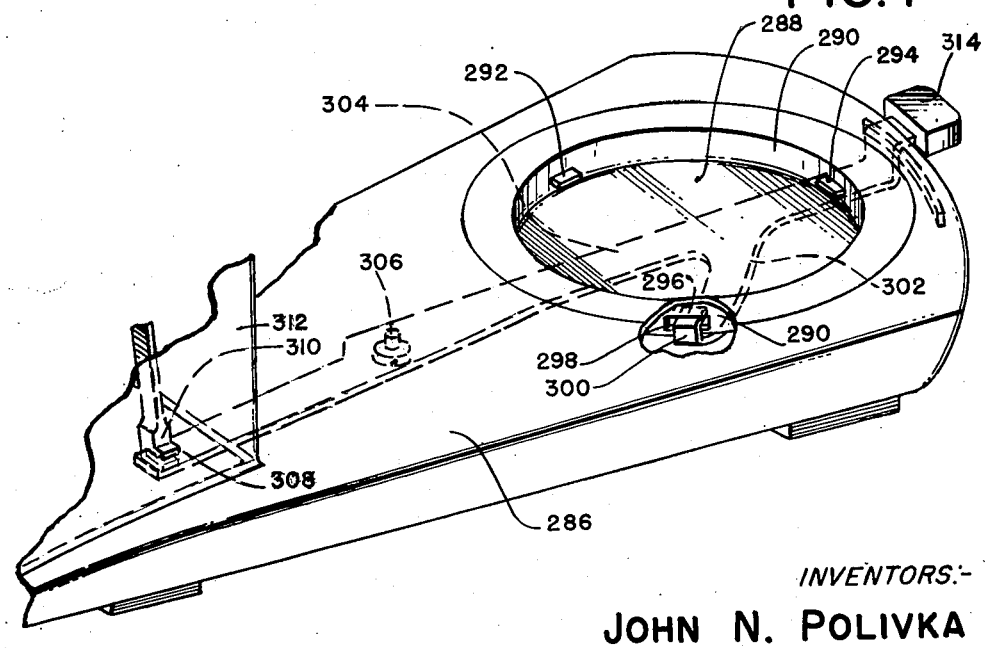
INVENTORS:-
JOHN N. POLIVKA
GEORGE T. SCHARFENBERG
BY William C. Babcock
ATTORNEY Patented Nov. 4, 1952

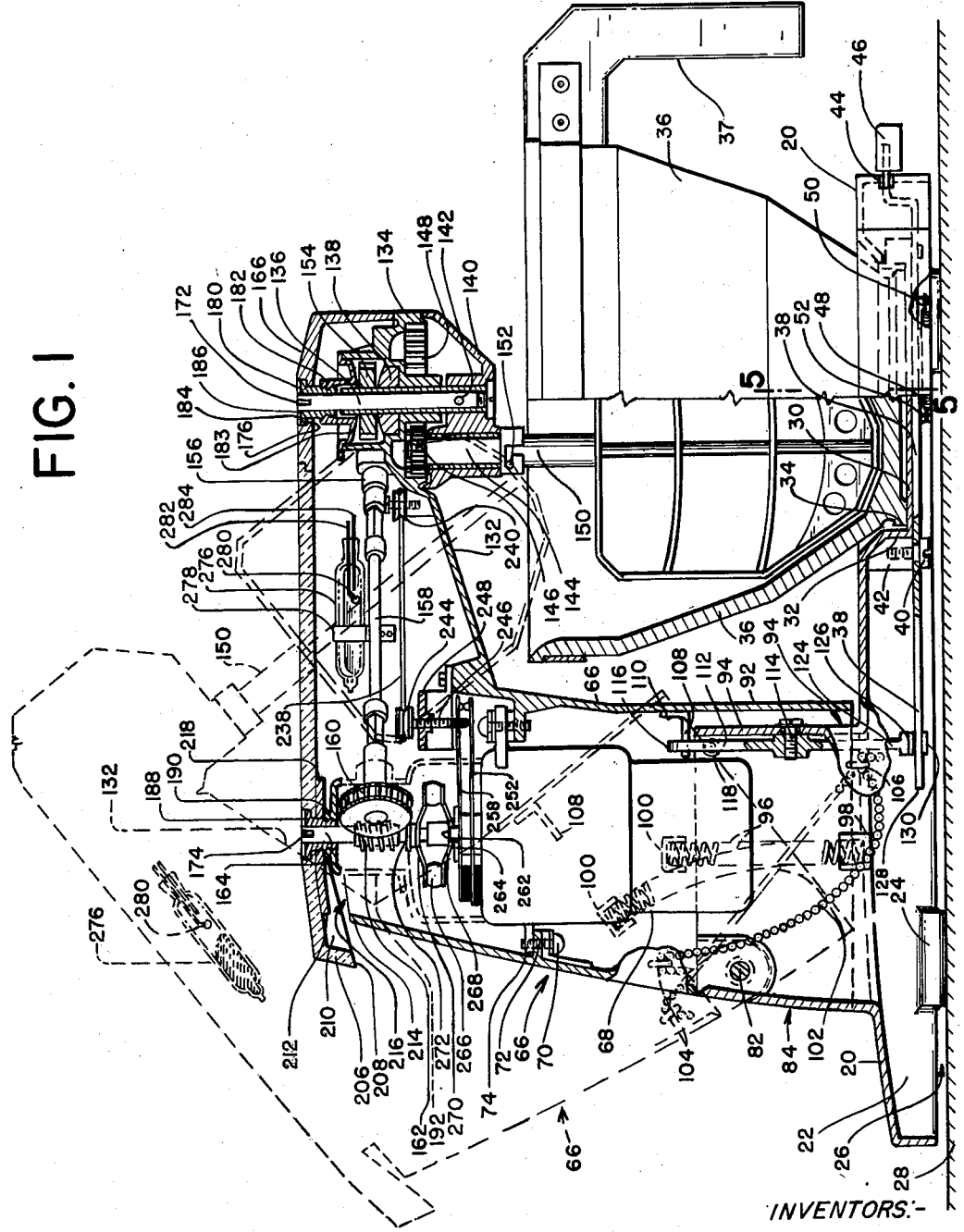

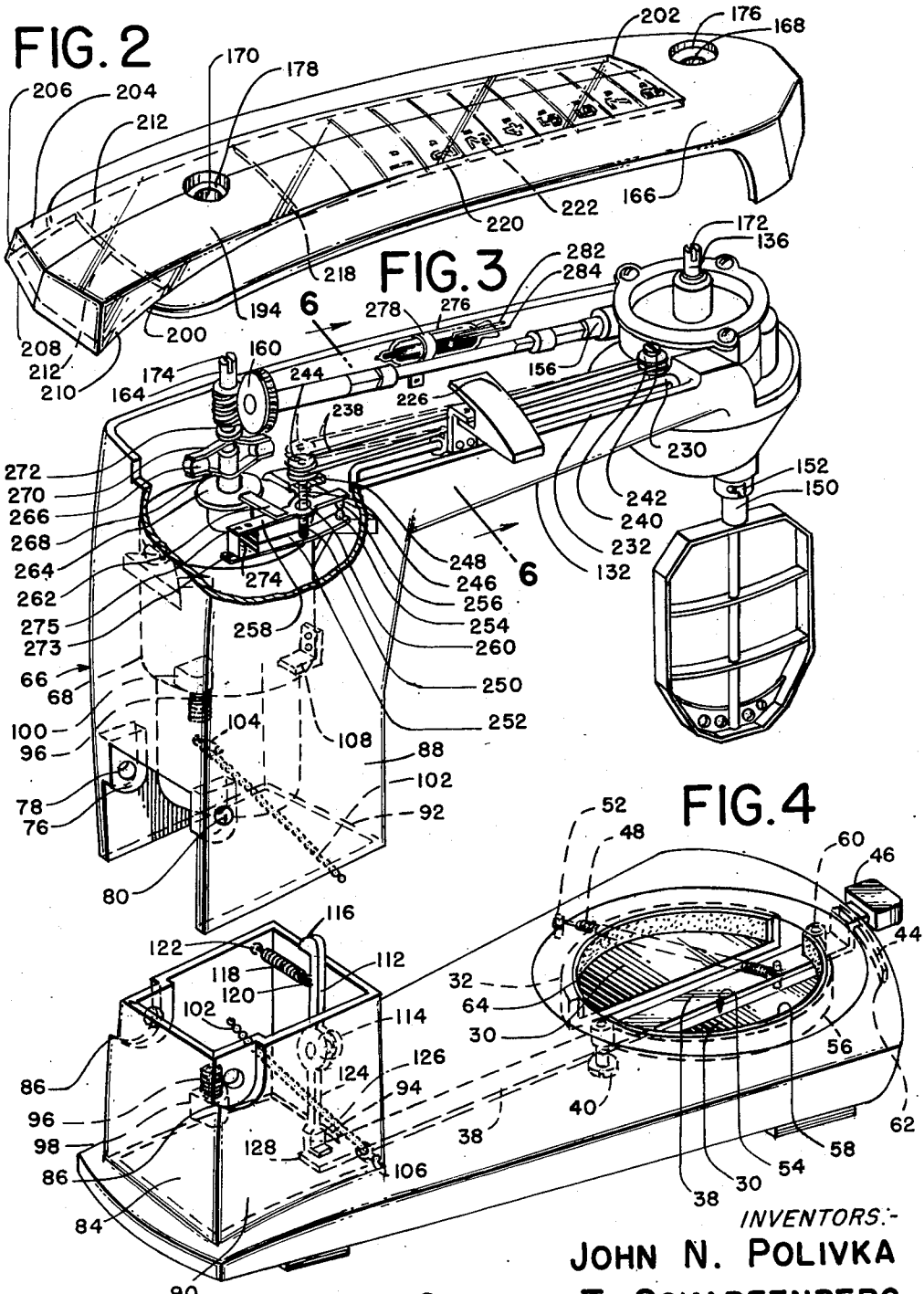

2,616,674

UNITED STATES PATENT OFFICE 2,616,674

FOOD MIXER

John N. Polivka and George T. Scharfenberg, Minneapolis, Minn., assignors to General Mills, Inc., a corporation of Delaware Application January 3, 1950, Serial No. 136,571

26 Claims. (Cl. 259—102)

The present invention relates to household food mixers and particularly to an improved combination of novel features in such a mixer.

Food mixers currently available to the consumer are generally of the type in which a motor and gear casing unit is mounted above a mixing bowl and is provided with beaters projecting downwardly into the bowl. Because of the relatively high location of the motor, this type of mixer tends to require substantial shelf height for storage purposes and is also relatively top-heavy and unstable. Furthermore, these mixers are often provided with means to tilt the motor and gear casing upwardly to remove the beaters from the bowl. If the mixer is tilted in this manner while the motor is operating, the beaters will continue to rotate and will throw portions of the material being mixed out of the bowl. While some attempts have been made to avoid these defects of the prior art by changing the location and arrangement of the motor and the general design of the mixer, none of these attempts, so far as we are aware, has been developed with any degree of commercial success.

Furthermore, many of the existing food mixers have speed control mechanism and indicating scales which are difficult to adjust and observe during normal operation. Also, while various power take-off arrangements have been proposed in the past, it is not feasible in an overhead mixer of ordinary construction to provide a direct power take-off operating at high speed for connection to a device of the bottom drive type such as a blender.

With these defects of the prior art in view, it is accordingly one object of the present invention to provide an improved location and arrangement of the parts in a household food mixer.

Another object of the invention is the provision of an improved mixer in which the motor is located relatively close to the base with the motor shaft oriented in a substantially vertical position.

A further object is the provision of an improved motor location and arrangement in which the motor, with its shaft substantially vertical, is located in a housing or pedestal at the side of the usual mixing bowl, the entire housing including the motor being tiltable to a retracted position in which the beaters can be removed from the bowl. Still another object of the invention is to provide a food mixer in which the beater is of the planetary type and in which a movable clamp is provided to hold the bowl firmly in position.

Still another object is a food mixer in which the beater supporting casing is resiliently urged to a retracted position in which the beaters are removed from the bowl.

A further object is a mixer in which the beater unit is urged toward a retracted position with respect to the bowl and in which a latch is provided for holding the beaters in operative position. Another object is a mixer of this type in which a latch holding the beaters in operative position, and a clamp holding the bowl firmly in place may be operated simultaneously to release the bowl and permit the beater to move to retracted position.

A further object is the provision of a mixer in which the motor is mounted with its shaft in a vertical position and with a direct power take-off at the upper end of the shaft for operation of a blender or similar device.

A further object is the provision of an automatic switch in a mixer of the tilting head type, which will automatically stop the operation of the beaters when the head is tilted to withdraw the beater from the bowl.

Another object is the provision of a mixer with an improved location and arrangement of the speed control mechanism and speed indicating scale.

Another object is the provision of a mixer in which the motor is located in an upright housing at the side of a mixing bowl support, with the lower part of the housing rigidly connected to the base, and with the upper portion of the housing, including the motor, being pivoted for tilting movement between operating and retracted positions.

A further object is the provision of a mixer of improved and economical construction in which all the parts are accessible for adjustment through a readily removable cover member.

Other objects and advantages of the invention will be apparent from the following specification in which a preferred embodiment of the invention is described.

In the drawings which form a part of this application,

Figure 1 is a side view, with portions broken away and other portions shown in section, of an improved household food mixer according to the invention.

Figs. 2, 3, and 4 constitute an exploded view of the removable cover, the motor housing and gear casing, and the base and support respectively.

Fig. 5 is a sectional view on the line 5—5 of Fig. 1.

Fig. 6 is a sectional view on the line 6—6 of Fig. 3, and

Fig. 7 is a perspective view similar to Fig. 4 showing an alternate form of bowl clamping mechanism.

As shown particularly in Fig. 1, the mixer includes a supporting base 20 having a downwardly extended peripheral flange 22 and supporting legs 24. The legs 24 space the lower edge of the flange 22 slightly above the surface of a table 28 or other support in order to provide an air space or ventilation opening 26 through which air may be exhausted from the motor housing in the manner to be described.

At one end of the base 20 this a bowl support 30 which is recessed downwardly as shown at 32 from the upper surface of base 20 in order to accommodate the base 34 of a mixing bowl 36. Bowl 36 is preferably provided with a handle 37 for convenience in manipulation.

In order to hold the bowl firmly in operative position, suitable clamping mechanism is provided. This mechanism includes a clamping lever 38 which extends substantially longitudinally of the base and is pivoted to the base by a bolt 40 threaded into a boss 42 on the underside of the base. One end of the clamping lever 38 is upwardly offset and projects through a slot 44 in the front skirt portion of the base. An operating knob 46 on the projecting end of lever 38 may be operated by the user to release the clamp.

Clamping lever 38 is provided with means normally urging it toward bowl clamping position. In the example shown, this means is in the form of a spring 48 located beneath the clamping member and support and fastened at one end to a stud 50 on clamping lever 38, and at the other end to a stud 52 on the support itself. Thus spring 48 normally urges the knob 46 and the corresponding end of lever 38 toward the far side of the mixer as viewed in Fig. 1.

Further details of the clamping mechanism are shown in Fig. 4. The bowl support 30 is provided with a longitudinal slot 54 to accommodate the clamping end of lever 38 as shown. Carried by this end of lever 38 is a substantially semi-circular clamp 56 which fits above one side of the bowl supporting bottom 30 and adjacent the vertical wall of the bowl supporting recess. Clamp 56 is lined at 58 with resilient material adapted to engage the base of the bowl firmly and resist twisting and removal of the bowl. Clamp 56 is fastened to lever 38 in any desired manner, for example by means of bolts 60.

The spring 48 thus normally urges the clamping lever 38 and clamp 56 to the far side of Fig. 4 as shown by the heavy line position of the parts. At the same time by manipulation of knob 46, the user can bolt the clamp against the resistance of spring 48 toward the near side of the figure to a bowl-releasing position in which the mixing bowl 36 can be inserted or removed.

Cooperating with the movable clamp 56 is a stationary resilient lining portion 64 on the opposite vertical wall 32 of the bowl supporting recess 30. Thus the bowl base 34 is resiliently clamped against inadvertent removal and accidental rotation after the bowl has been inserted and the clamping lever knob 46 released to permit movement of the clamp to bowl retaining position.

As already indicated, the motor of the present mixer is supported in a novel manner in a hollow upright housing located at one side of the mixing bowl, i. e., at the other end of the base 20 from the bowl support 30. As shown in Fig. 1, this upright housing includes a stationary lower portion or pedestal and an upper movable portion movably mounted with respect to the pedestal. The movable housing portion 66 supports the motor 68 by means of bolts 70 passing through cooperating flanges 72 and 74 on the housing and motor respectively. Movable housing portion 66 includes thickened bearing portions 76 on opposite sides of the housing at the rear of the mixer, i. e., the point farthest from the mixing bowl. Bearing portions 76 are provided with bearing openings 78 and 80 through which hinge or pivot shaft 82 may project.

This shaft 82 extends substantially horizontally and transversely with respect to the base and is spaced above it. Shaft 82 is carried by the lower stationary housing portion or pedestal 84 which may be recessed at its upper rear corners as shown at 86 for accommodation of the bearing portions 76 of the movable housing 66.

As shown particularly in Figs. 3 and 4, the movable housing 66 is provided with downwardly extending side walls 88 and front wall 92 which overlap the side walls 90 and front wall 94 of pedestal 84 when the housing is in the operative position shown in heavy lines in Fig. 1. This overlap is provided in order that the housing 66 may swing from the operating heavy line position of Fig. 1 to the retracted or dotted line position of the figure without exposing the motor and other working parts located within the housing 66. For example, the amount of overlap of front housing wall 92 with respect to front pedestal wall 94 is sufficient so that when the housing 66 swings to the retracted position, there will be no substantial gap between the respective wall portions.

According to the invention, the mixer is provided with means normally urging the housing 66 from operating to retracted position. As shown in Fig. 1 the particular means provided for this purpose includes one or more compression springs 96 supported at the lower end by sockets 98 in the base or the side wall of pedestal 84 and held in position at the upper end by projection 100 on the side wall of housing 66. In the position of Fig. 1, spring 96 is under compression and therefore urges the housing 66 upwardly to the retracted dotted line position of the figure. In order to limit the upward movement, cooperating stops may be provided on the pedestal 84 and housing 66. In the present case the necessary stop is shown in the form of a cord or chain 102, the upper end of which is fastened at 104 to the side wall of housing 66, while the lower end is fastened at 106 to the base.

In order to hold the parts in the operative position of Fig. 1, a releasable latch has been provided. This latch includes a locking projection or bracket 108 fastened at 110 to the front wall of the movable housing 66. A movable latch 112 is pivoted at 114 to the front wall 94 of the stationary pedestal 84 and has at its upper end a latch hook 116 adapted to engage the upper surface of projection 108 to hold the housing 66 in operative position. Springs 96 urge the housing and projection 108 up against the latch hook 116, with the beater just clearing the bottom of the bowl. Pivoted latch 112 may be rotated between locked and unlocked positions and is normally urged to the locked position by a spring 118 fastened at 120 to the upper arm of latch 112 and fastened at 122 to the side wall of pedestal 84.

The downwardly extending lower arm 124 of latch 112 terminates in a flat face 126 against which the end 128 of bowl clamping lever 38 is adapted to engage. Latch arm 124 also has a horizontally extending hook or projection 130 which fits beneath the arm 128 to prevent inadvertent deformation or disengagement of the parts. The connection or interengagement of portion 126 of latch 112 and end 128 of lever 36 provides for simultaneous operation of the releasable latch and the bowl clamping mechanism. Thus when operating knob 46 is moved from the bowl clamping position of Fig. 4 to the bowl releasing position at the end 62 of slot 44, the clamping lever arm 128 will engage portion 126 of latch lever 112 and will rotate the latch from the locking position of Fig. 4 to its released position, in which hook 116 will be disengaged from projection 108 and will permit housing 66 to tilt to retracted position under the influence of spring 96. At the same time, the operation of clamping lever 46 has released the bowl 36 so that it can be removed.

In order to support the desired beater mechanism in the mixing bowl 36 as well as certain desired food processing attachments, the movable upright housing 66 is provided with a lateral substantially horizontal extension or casing 132 which projects from the housing to a point above the mixing bowl. The outer or front end 134 of this casing 132 carries a substantially vertical shaft 136 which is rotatably mounted in the casing and in this particular arrangement is centered with respect to the bowl support. Shaft 136 is carried in a suitable bearing portion 138 of casing 132 and has at its lower end a planetary mixing head 140. This head 140 is keyed to shaft 136 by a shear pin 142 in known manner. A planetary beater drive shaft 144 is mounted in the planetary head 140 and is laterally offset with respect to the power shaft 136. At its upper end, beater drive shaft 144 has a pinion 146 which meshes with an internal ring gear 148 in the casing end 134. Thus rotation of the power shaft 136 on its axis will cause the beater drive shaft 144 to rotate on its own axis in the opposite direction and at the same time to revolve around the axis of shaft 136 with the planetary head 140. A beater 150 of any desired construction is removably attached to the beater drive shaft 144 in known manner, for example by a bayonet slot connection 152. With the parts in the position of Fig. 1, operation of power shaft 136 will accordingly cause planetary rotation of beater 150 within mixing bowl 36 to agitate thoroughly the contents of the bowl.

In order to operate the vertical power shaft 136, suitable driving connections are located in the casing 132 between the motor 68 and power shaft 136. The power shaft itself carries a worm gear 154 driven by a worm (not shown) located on the outer end 156 of a shaft 158 which extends substantially longitudinally of casing 132. Another worm gear 160 at the other end of connecting shaft 158 is driven directly by a worm 162 on the motor shaft or motor shaft extension 164.

As shown particularly in Figs. 1 and 3, both the housing 66 and casing 132 are of open-topped construction. By reason of this construction it is possible to assemble the various parts of the driving mechanism in fully operative position and to adjust the necessary parts before the removable cover of the present invention is fastened in position. This cover 166 is shown in Figs. 1 and 2 and is designed to provide a closure for the top openings of both the housing portion 66 and casing portion 132. In order that various accessories and attachments may be driven from the power shaft 136 and also directly from the motor shaft 164, cover 166 is provided with spaced openings 168 and 170 which are aligned respectively with the power shaft 136 and motor shaft 164. The latter shafts are provided with slots 172 and 174 or other driving connections at their upper ends, these driving connections being accessible through cover openings 168 and 170.

At the upper end of each of openings 168 and 170, the cover is countersunk or recessed as shown in 176 and 178 respectively to accommodate novel cover fastening members according to the invention. Thus the cover retaining member 180 has an annular body portion, the lower end of which is threaded into a supporting hub 182 formed as an integral part of the gear box cover 183. The annular fastening member 180 also has an external shoulder 184 at its outer end which is adapted to fit in the countersunk portion 176 of the cover opening to hold the cover firmly in position. Key slots 186 in the outer end of the fastening member make it possible to screw the member 180 into the threaded supporting hub 182 to fasten the cover firmly in place. Thus the annular fastening member 180 serves both as a means of clamping the cover 166 firmly in position over the open top of housing 66 and casing 132, and also as a bushing which fits closely around the upper end of power shaft 136 to provide additional bearing support for the latter. It will be apparent that the diameter of openings 168 and 170 in the cover is substantially greater than the diameter of the power shaft 136 and motor shaft 164 in order that an annular space will be provided for accommodation of the fastening member 180. In the assembled position of the parts the upper surface of the cover, the top of the fastening member 180, and the upper end of power shaft 136 are substantially flush with each other to provide a smooth relatively unbroken surface at the top of the mixer.

The fastening member 188, which passes through opening 170 and around motor shaft 164 is substantially identical with the member 180 just described. Member 188 is threaded into a supporting boss 190 on the top of a gear box or protective cover 192 above motor 68. Thus the particular location and arrangement of the parts already described provide a mixer construction in which two power take-offs are available at spaced points on the mixer, one of the take-offs being a direct relatively high speed take-off from the top of the vertical motor shaft, and the other being a relatively slower speed power take-off located in this case above the mixing bowl end of the casing 132. Any desired attachments and accessories may be driven from the respective power take-offs. For example, a fruit juice reaming mechanism can be mounted above the casing 132 and driven from the power shaft 136. Various fruit juice attachments of this type are well known in the art and need not be described in detail.

Similarly, a high speed attachment such as a "bottom drive" mixer or blender may be mounted above the housing 66 and driven directly from the motor shaft 164 when high speed operation of such an attachment is desired. Both of the high and low speed attachments are available at all times without the necessity of removing or rearranging any of the housing or casing parts as is necessary in certain constructions previously proposed in the art.

According to another feature of the invention the removable cover 166 is provided with a plastic insert 194 which fits in a recess 196 (Figs. 2 and 6) in the cover. The edges of the insert 194 and recess 196 are formed as interfitting or interlocking portions 198 so that the top surfaces of the insert and of the cover are substantially flush throughout the major area of the top. The recessed portion of cover 166 extends to one edge, in this case the rear end of the cover as indicated at 200, while the other end of recessed portion terminates just short of the power take-off opening 168. Thus in this case, the power take-off opening 168 is provided in the cover 166 itself, while the opening 170, or at least the upper recessed portion 178 of opening 170 is formed in the plastic insert 194.

At the rear of the mixer, the insert 194 projects beyond the rear casing wall as indicated at 204. This projecting portion 204 has a downwardly extending rear peripheral flange 206, the lower edge of which is indicated at 208, and peripheral side flanges 210.

The rear edge of the cover 166 is cut back slightly as indicated at 212, while the upper edge of the rear wall of housing 66 is cut away as shown at 214 to provide a ventilation opening 216 at the upper rear edge of the housing 66 beneath the extention 204 of the cover insert 194. Thus a ventilation opening is provided which is substantially concealed by the peripheral flanges 206 and 210 of the cover extension 204. At the same time, this extension 204 also serves as a carrying or lifting handle for the mixer. Thus, with the parts latched in the position of Fig. 1, it is relatively convenient for the user to grasp the extension 204 with one hand and the outer end of the casing portion 132 with the other hand to transport the mixer from one location to another. At the same time, the particular location of this upper ventilation opening on the rear side of the mixer, in combination with the ventilation space 26 below the edge of base 20, makes it possible to ventilate the motor housing 66 by a downward flow of air without substantial risk of drawing dust or particles of food into the housing. When the opening 216 serves as an air intake, it is located at a relatively remote point from the mixing bowl, and is also high enough so that dust from the top of table 28 will not be drawn into the housing.

In this particular form of construction, it will be noted that the recessed portion in the cover is entirely cut away from the stepped forward edge 202 of the recess to the point 218 near the rear of the cover. Thus a substantial portion of metal is provided between the edge 218 and the rear edge 212 to strengthen the rear end of the cover and to be clamped in position beneath the plastic insert and annular fastening member 188. If desired, the plastic insert 194 may be adhesively fastened within the recess 196 of the cover 166. However, the interfitting ridges of the plastic insert in the recess make such cementing unnecessary, since the annular fastening member 188 will prevent upward withdrawal of the plastic insert 194, while the interfitting edges will prevent relative lateral movement between the parts.

In addition to its function in the provision of handle extension 204, the plastic insert 194 also serves as a convenient method of locating and mounting an indicating scale to show the operative conditions for which the mixer mechanism is set. As illustrated, the scale 220 extends longitudinally of the top cover of the mixer and includes an off position, which in this case is located toward the rear or motor housing portion of the mixer, and a plurality of numbered steps representing different speed adjustments and extending toward the front of the mixer. The individual characters or indicia which make up this scale may be provided in various ways. As shown in Figs. 2 and 6, the numbers, indicated at 222, may be etched on the lower surface of the plastic insert 194 and suitably colored so that the scale will be visible through the upper plastic portion which remains transparent. It would also be possible to provide the indicating scale on a separate sheet to be clamped in the recess between the plastic insert 194 and the remainder of cover 166. In any event, a convenient scale is provided which can be read easily from a position in front of the mixer or at either side thereof.

Cooperating with the scale 220 is a pointer 224 on an adjusting knob 226 mounted on the casing portion 132. This adjusting knob 226 is fastened on a control arm 228 which is slidably mounted on a rod 230 for movement longitudinally of the mixer and parallel to scale 220. The edge of the side wall of the casing portion 132 is cut away or recessed at 232 to provide a longitudinal slot 234 between the casing edge and the edge 236 of cover 166. The control knob 226 and control arm 228 can thus project through the slot 234 to permit the longitudinal adjustment of the knob and control arm on rod 230.

While any desired speed control mechanism may be utilized in connection with motor 68, the operation of control knob 226 has been illustrated in connection with a control wire 238 fastened to control arm 228 and passing around a pulley 240 journaled on a shaft 242 at the front end of casing 132. The control wire 238 is also passed around the head 244 of a control shaft 246 which is threaded into a stationary bracket 248 in the motor housing. By reason of the threaded engagement between the shaft 246 and the bracket 248, rotation of the shaft will result in axial movement thereof in a vertical direction. Thus it is possible to move the adjusting shaft 246 up or down as the control knob 226 is moved toward the front or rear of the casing.

The lower end of adjusting shaft 246 carries an insulating portion 250 for engagement with a switch arm 252 of the motor governor mechanism. Switch arm 252 carries a contact 254 which cooperates with a contact 256 on a movable switch arm 258 to make and break the motor circuit in response to action of the governor. The upper switch arm 258 has an opening 260 through which the adjusting shaft 246 projects to engage the lower switch arm 252. The upper switch arm 258 also has a lateral extension 262 for engagement with the slidable collar 264 of the governor unit. Since any desired form of governor construction and governor switch may be utilized, the showing of these parts is substantially schematic and is designed primarily for illustration of the general location of the parts and the arrangement of the remaining portions of the control mechanism.

Thus the governor collar 264 is slidable vertically on the motor shaft 164 and is keyed to the shaft for rotation therewith. The collar 264 is carried by laterally projecting arms 268 at the outer end of which are the governor weights 266 which in this case are also formed to serve as fan blades. Another radial arm 270 connects each governor weight 266 with a stationary collar 272 fastened to motor shaft 164. The arrangement of the fan blade portions of the governor weights 266 is such that rotation of the motor shaft 164 causes a circulation of air downwardly through the housing 66, the air being drawn in through the ventilation opening 216 at the top rear of the housing, and being discharged beneath the lower edge of the base of the mixer. As will be readily understood, an increase in the speed of rotation of shaft 164 will cause the governor weights 266 to move outwardly and to lift the collar 264. Upward movement of the collar will ultimately cause engagement of the switch arm 262 and will lift the contact 256 to break the circuit when the particular speed is obtained for which the other switch arm 252 has been set. The position of this other switch arm is determined by the particular setting of the control knob 226, which in turn controls the vertical position of the insulating knob 250 against which the switch arm 252 is biased into resilient engagement.

The switch arms 252 and 258 are mounted on an insulating block 174 in known manner and are provided with means 273 and 275 respectively for connection in the motor circuit in known manner.

When the control knob 226 is moved all the way to the rear of the mixer to the off position shown by the scale, the rotation of control shaft 246 will urge the shaft downwardly so that the switch arm 252 and contact 254 will be moved completely away from the contact 256 even when the motor shaft 164 is stationary and contact 256 is in its lowest position. Thus the control member 226 and control shaft 246 function both as an "on-off" switch and also as a speed adjusting control member in known manner.

According to a further feature of the invention, the mixer is also provided with additional switch means to cut off the motor circuit automatically, whenever the bowl clamping knob 46 is manipulated to release the bowl and permit tilting of the motor housing 66 to its retracted position. While this automatic switch may assume various forms, it has been illustrated as a switch of the liquid contact type shown at 276 in the drawings. This switch, of which a mercury switch is typical, is carried in a supporting bracket 278 mounted within the casing portion 132 of the mixer. A switch of this type has spaced contacts 280 connected to external leads 282 and 284. When the switch is in the heavy line position of Fig. 1, the liquid conductor within the switch envelope completes the circuit between the spaced contacts 280 so that energization of the motor 68 can take place whenever the on-off switch, or in this case the governor control switch, is moved to closed position. Normally, the speed control knob 226 would be moved rearwardly to its off position before the bowl clamping knob 46 is operated to release the bowl and tilt the mixer to retracted position. However, should the operator forget to deenergize the motor before releasing the clamp at 46, the movement of the casing 132 to retracted position will tilt the switch 276 so that the liquid conductor will no longer bridge the space between the contacts 280. Thus, as shown in the dotted line position of the switch in Fig. 1, the motor circuit will be broken at this point and the operation of the beater 150 will be automatically discontinued. The particular connections by which leads 282 and 284 and the governor switch leads 273 and 275 are connected in the circuit with the motor 68 are well known and need not be described. Thus the provision of the switch 276 and the automatic movement of the switch to off position in response to movement of the motor housing from operating to retracted position contribute to the safety and convenience in operation of the device.

In Fig. 7, an alternate form of clamping mechanism for the bowl is shown. In this case the mixer base 286 is substantially the same as that shown in the earlier figures. The bowl support includes a bottom portion 288 which in this case is unbroken, i. e., which includes no slot as in the case of the previous embodiment. This bowl support 288 is recessed below the upper surface of the base 286 and includes a substantially vertical wall portion 290. Stationary clamps 292 and 294 project from points substantially 120° apart on the circumference of the wall 290. These hooks or lugs are adapted for engagement in the annular recess of the bowl base illustrated in the previous figures.

Cooperating with these fixed lugs 292 and 294 is a movable clamp or hook 296 which is spaced on the opposite portion of the circumference at the midpoint of the major arc between clamps 292 and 294. Movable clamp 296 projects through a slot 298 in the vertical wall portion 290 of the recess. When the clamp 296 is withdrawn from the slot and from the recess, it is possible to insert the bowl in the recess by engaging the flange at the base of the bowl beneath the stationary clamps 292 and 294 and letting the bowl tilt into horizontal position against the bottom of the recess 288. The clamp 296 may then be projected out through the slot 298 to clamp the remaining side of the bowl base and hold the bowl firmly in position.

The clamp 296 is connected by a vertical arm 300 to a lateral arm 302 beneath the bowl support 288. Lateral arm 302, in turn, is carried by a clamping lever 304 which is pivoted at 306 to the base 286. The rear end 308 of the clamping lever 304 is adapted to engage portion 310 of a releasable latch in the same manner as in the previous embodiment, the latch being mounted within pedestal 312 on the mixer base. The other end of the clamping lever 304 projects through a slot in the front skirt of the base and is provided with an operating knob 314 just as in the previous case. The spring (not shown) may again be used to urge the lever 304 to bowl-clamping position in which the clamp 296 will be projected inwardly through slot 298 to hold the bowl in place.

As described in the foregoing specification, an improved construction and arrangement of a household food mixer have been provided. This construction accomplishes the objects of the present invention and makes it possible to produce a food mixer which is stable, easy to operate, adapted for use with a plurality of accessories, and which can utilize a large and powerful motor without sacrifice of stability or attractive appearance.

Since minor variations and changes in the exact details of construction will be apparent to persons skilled in this field, it is intended that this invention shall cover all such changes and modifications as fall within the spirit and scope of the attached claims.

Now, therefore, we claim:

1. A household food mixer comprising a base, a bowl support at one end of the base, an upright hollow housing extending upwardly from the other end of the base, a casing portion normally extending rigidly and laterally from an upper portion of the housing to a point above the bowl support, a beater drive shaft rotatably mounted in the casing above the support, a motor fixed in the housing close to the base with the motor shaft substantially vertical, and driving means in the casing operatively connecting the motor and beater shafts, the housing having a lower portion pivoted to the base for simultaneous tilting movement of the housing, motor, and beater shaft between an operating position, in which the housing and motor shaft are substantially vertical and a beater driven by the drive shaft will effectively engage the contents of a bowl located in the support, and a retracted position in which the upper portion of the housing and motor shaft are tilted away from the bowl support and the drive shaft and beater are withdrawn from the support and bowl.

2. A food mixer according to claim 1 in which the base has a relatively short stationary hollow pedestal at said other end, the vertical housing being pivoted to the pedestal, and the pedestal and housing having overlapping wall portions concealing and protecting the motor in both the operating and retracted positions of the housing.

3. A household food mixer comprising a base, a bowl support at one end of the base, an upright hollow housing having a lower portion hinged at the other end of the base for tilting movement of the housing between a substantially vertical operating position and a retracted position in which the upper portion of the housing is tilted outwardly away from the bowl support, a casing extending rigidly and laterally from the upper portion of the vertical housing and having an end above the bowl support, a vertical beater drive shaft rotatably mounted on the casing end, a motor rigidly mounted in the hinged vertical housing immediately above the base with the motor shaft substantially vertical, and driving means in the casing operatively connecting the motor and beater shafts.

4. A household food mixer comprising a base, a bowl support at one end of the base, an upright hollow housing having a lower portion hinged at the other end of the base, an integral casing extending laterally from the housing above the bowl support, a vertical drive shaft in the casing above the support, a motor mounted in the hinged vertical housing at a level close to the base with the motor shaft substantially vertical, driving means in the casing operatively connecting the motor and drive shafts, the housing and casing having a common opening at the top for access to the shafts and the driving means, and a single removable top cover plate for the housing and casing opening.

5. A household food mixer comprising a base, a bowl support at one end of the base, an upright motor housing having its lower end hingedly mounted at the other end of the base and having an integral casing extending outwardly from the upper end of the housing over the bowl support, a food tool drive shaft rotatably mounted in the casing, a motor mounted in the lower portion of the housing adjacent the base with the motor shaft substantially vertical and projecting above the motor, reduction driving means in the upper portion of the housing and casing connecting the motor shaft and drive shaft, the upper end of the motor shaft having a driving connection accessible through the top of the housing in all positions of the housing for direct driving engagement with a high speed attachment, and the food tool drive shaft having a means for driving engagement with a lower speed attachment.

6. A household food mixer comprising a base, a bowl support at one end of the base, an upright motor housing having a lower portion hingedly mounted at the other end of the base and having an integral casing extending outwardly from the housing over the bowl support, a vertical food tool drive shaft rotatably mounted in the casing, a motor mounted in the housing closely adjacent the base with the motor shaft substantially vertical and projecting above the motor, reduction driving means in the upper portion of the housing and casing connecting the motor shaft and drive shaft, the upper end of the motor shaft having a driven connection accessible through the top of the housing in all positions of the housings for direct driving engagement with a high speed attachment, and the upper end of the food tool drive shaft having means accessible through the top of the casing for driving engagement with a lower speed attachment.

7. A household food mixer comprising a base, a bowl support at one end of the base, an upright open-topped motor housing having its lower end hingedly mounted at the other end of the base and having an integral open-topped casing extending outwardly from the upper end of the housing over the bowl support, a vertical food tool drive shaft rotatably mounted in the casing, a motor mounted in the housing close to the base with the motor shaft substantially vertical and projecting above the motor, reduction driving means in the housing and casing connecting the motor shaft and drive shaft, and a single removable cover for the housing and casing having spaced openings aligned with the respective motor and drive shafts, the motor and drive shafts each having driving connections at their upper ends accessible through the cover openings for selective independent and simultaneous operation of high speed and lower speed attachments respectively.

8. A household food mixer comprising a base, bowl clamping means on the base movable between bowl clamping and bowl releasing positions, a housing mounted on the base and having a beater drive shaft located above the bowl clamping means, the housing being mounted for movement between an operating position, in which a beater on the drive shaft will engage the contents of a bowl held by the clamping means, and a retracted position in which the beater is withdrawn from the bowl, means urging the housing to retracted position, latch means holding the housing in operating position, and a connection between the bowl clamping means and latch means releasing the latch when the clamping means is moved to bowl releasing position.

9. A household food mixer comprising a base, bowl clamping means on the base movable between bowl-clamping and bowl-releasing positions, a beater supporting housing mounted on the base for movement between operating and retracted positions with respect to a bowl held by the clamping means, a releasable latch for holding the housing in operating position, and means connecting the bowl clamping means and the latch and releasing the latch when the bowl clamping means is moved to bowl-releasing position.

10. A mixer according to claim 9 including a motor, a switch movable from first to second positions to deenergize the motor, and means connecting the switch with the housing for automatic movement of the switch to second position when the housing is moved to retracted position.

11. A mixer according to claim 10 including resilient means normally urging the housing toward retracted position.

12. A mixer according to claim 10 in which the switch is a liquid contact type switch mounted in the housing for automatic tilting to off position when the housing moves to retracted position.

13. A mixer according to claim 9, the bowl-clamping means including a clamp lever pivoted to the base on a vertical axis for rotation in the plane of the base and resilient means urging the clamp to bowl clamping position, and the releasable latch including a latch lever pivoted on a horizontal axis and having a portion directly engaging the clamp lever, and resilient means normally urging the latch to locking position.

14. A mixer according to claim 9 in which the bowl-clamping means includes a stationary clamp at one side of the base and a movable clamp pivoted to the base for movement toward and away from the stationary clamp.

15. A mixer according to claim 14 in which the clamps have bowl engaging portions lined with frictional material.

16. A mixer according to claim 14 in which the clamps include projecting lugs for engagement in an annular recess at the base of a bowl.

17. A mixer according to claim 14 in which the movable clamp extends longitudinally of the base and has a finger piece projecting from the end of the base opposite the housing.

18. A household food mixer comprising a base, a beater-supporting housing mounted on the base for movement between operating and retracted positions with respect to the base, a releasable latch for holding the housing in operative position, and means for clamping a bowl on the base, said bowl-clamping means being movable between bowl-clamping and bowl-releasing positions and being operatively connected to said latch thereby releasing the latch in response to movement of the clamping means to bowl-releasing position.

19. A household food mixer comprising a base, a beater-supporting housing mounted on the base for movement between operating and retracted positions with respect to the base, resilient means normally urging the housing to retracted position, releasable latch means for holding the housing in operative position, and means for clamping a bowl on the base, said bowl-clamping means being movable between bowl-clamping and bowl-releasing positions and being operatively connected to said latch means for simultaneous release of the latch means and movement of the clamping means to bowl-releasing position.

20. A household food mixer comprising a base, a beater-supporting housing mounted on the base for movement between operating and retracted positions with respect to the base and normally urged to retracted position, releasable latch means for holding the housing in operative position, and means for clamping a bowl on the base, said bowl-clamping means being movable between bowl-clamping and bowl-releasing positions and being operatively connected to said latch means for simultaneous release of the latch means and movement of the clamping means to bowl-releasing position.

21. A household food mixer according to claim 20 in which one of said releasable latch means and bowl-clamping means has an externally accessible manually operable portion for simultaneous release of the latch and clamp.

22. A household food mixer according to claim 20 in which said bowl-clamping means has an externally accessible manually operable portion for simultaneous release of the latch and clamp.

23. A household food mixer comprising a base, a bowl support at one end of the base, an upright housing portion at the other end of the base, a horizontal casing portion extending from the upper end of the housing parallel to the base to a point above the bowl support, a beater drive shaft in the casing portion, a motor in one of said portions connected to said beater shaft, an indicating scale located on top of the casing and extending longitudinally of the casing and base, and a mixer control member mounted on the casing for movement longitudinally of the casing toward and away from the end of the base at which the bowl support is located, the control member being operatively connected to control the motor speed and having indicia cooperating with the scale and visible from a point above the casing to show the adjusted operating condition of the motor.

24. A food mixer according to claim 23 in which said scale and indicia are oriented for normal legibility by an operator looking from a point above the bowl support end of the casing and base down toward the opposite end of the unit.

25. A household food mixer comprising a base, a bowl support at one end of the base, an upright motor housing having its lower portion hingedly mounted at the other end of the base and having a casing portion extending rigidly from the upper portion of the housing to a point above the bowl support, a vertical food tool drive shaft rotatably mounted in the casing, a motor mounted in the housing close to the base with the motor shaft substantially vertical and projecting above the motor, driving means in the housing and casing connecting the motor shaft and drive shaft, and a control member slidably mounted in the casing for longitudinal movement with respect to the casing and base and operatively connected to the motor for controlling the speed of the latter, said housing and casing having a common top opening through which the driving means and control member connections are accessible, and a removable cover for said opening.

26. A food mixer according to claim 25 in which said cover and casing have spaced edges defining a longitudinal slot through which the control member projects, and the control member and cover have cooperating indicia visible from above the mixer and showing its adjusted operating condition.

JOHN N. POLIVKA.
GEORGE T. SCHARFENBERG.

REFERENCES CITED

The following references are of record in the file of this patent:

UNITED STATES PATENTS

| Number | Name | Date |
|---|---|---|
| 1,882,127 | Emmons | Oct. 11, 1932 |
| 2,046,784 | Krause | July 7, 1936 |
| 2,054,666 | Van Guilder | Sept. 15, 1936 |
| 2,075,851 | Johnston | Apr. 6, 1937 |
| 2,184,669 | Hansen | Dec. 26, 1937 |
| 2,270,980 | Tidbal | Jan. 27, 1942 |
| 2,292,566 | Jordan | Aug. 11, 1942 |
| 2,306,245 | Duke | Dec. 22, 1942 |
| 2,372,862 | Strauss et al. | Apr. 3, 1945 |